US005080750A

United States Patent [19]

Kurotaki et al.

[11] Patent Number: 5,080,750

[45] Date of Patent: Jan. 14, 1992

[54] SYSTEM FOR MAKING COMPOSITE BLOCKS

[75] Inventors: Atsutoshi Kurotaki; Shigeo Suda; Osamu Kodama; Shouichi Shirakura, all of Kumagaya; Takumi Tanikawa, Tokoname; Hideyuki Munakata; Kimio Yanai, both of Tokyo; Tadao Suemitsu; Masayuki Urashi, both of Sugito, all of Japan

[73] Assignees: Chichibu Cement Co.; Inax Corp.; ILB Co., Ltd.; Chiyoda Tech. & Ind. Co., Ltd., Japan

[21] Appl. No.: 483,938

[22] Filed: Feb. 23, 1990

[30] Foreign Application Priority Data

Feb. 23, 1989 [JP] Japan .................................. 1-44898
Apr. 3, 1989 [JP] Japan .................................. 1-84301

[51] Int. Cl.[5] ........................ B05C 11/02; B05D 1/32; B32B 31/00

[52] U.S. Cl. ..................................... 156/556; 118/57; 118/100; 118/504; 156/566; 427/282; 427/346

[58] Field of Search ............... 156/556, 563, 566, 569, 156/570; 118/100, 57, 504; 427/346, 282

[56] References Cited

U.S. PATENT DOCUMENTS 3,145,410 8/1964 Stahl .................................... 118/100
3,170,810 2/1965 Kagan ............................ 118/505 X
3,444,027 5/1969 Smith et al. ..................... 156/556 X
3,616,090 10/1971 Larson ........................... 156/557 X
3,712,825 1/1973 Yocum ............................ 427/282 X
3,891,484 6/1975 Lamberet ........................ 156/557 X
4,373,470 2/1983 Martin ............................ 118/504 X
4,492,180 1/1985 Martin ............................ 118/504 X
4,559,240 12/1985 Herbert, Jr. .................... 427/282 X
4,595,446 6/1986 Newkirk et al. ................ 156/556 X
4,622,239 11/1986 Schoenthaler et al. ........ 427/282 X
4,636,406 1/1987 Leicht ............................ 427/282 X
4,720,402 1/1988 Wojcik ................................ 427/282
4,776,919 10/1988 Troutner et al. .............. 156/566 X
4,830,723 5/1989 Galvagni et al. .............. 427/282 X
4,883,558 11/1989 Bellis et al. .................... 118/504 X
4,923,545 5/1990 Dickerson ....................... 427/282 X

*Primary Examiner*—Jan H. Silbaugh
*Assistant Examiner*—Karen Aftergut
*Attorney, Agent, or Firm*—King and Schickli

[57] ABSTRACT

A system for making a composite block, including a block body formed of mortar or concrete and a covering material such as a tile, natural stone or mortar sheet applied to the upper surface of the block body, includes an applicator for applying an adhesive material to the block body or covering material. The system also includes a press for loading vibration and/or pressure on a composite block assembly including the block body, the covering material placed thereon and an adhesive material disposed therebetween. Additionally, this system includes a finishing mechanism for finishing the pressed composite block assembly into the composite block by passing it through a hole of a size substantially corresponding to the contour of the composite block. The hole is formed through a scraper constructed from a flexible material.

12 Claims, 16 Drawing Sheets

SYSTEM FOR MAKING COMPOSITE BLOCKS

BACKGROUND OF THE INVENTION

The present invention relates to a system for making composite blocks, each comprising a block body formed of mortar or concrete and a covering material such as a tile, natural stone or mortar sheet applied on the upper surface of said block body.

Heretofore, no system has been used at all to automatically apply covering materials such as tiles to concrete blocks, etc. Accordingly, because composite blocks are exclusively made manually with simple tools or some machinery, productivity is low. Further, without automation there is a difference in workmanship from person to person, which makes it very difficult to obtain composite block products of uniform quality.

A main object of the present invention is therefore to solve such technical problems as mentioned above by the provision of a system which renders it possible to automatically make composite block products of uniform quality with high productivity.

More specifically, the present invention provides a system for making a composite block comprising a block body formed of mortar or concrete and a covering material such as a tile, natural stone or mortar sheet applied to the upper surface of the block body, comprising in combination:

applicator means for applying an adhesive material to said block body or covering material, pressing means for loading vibration and/or pressure on a composite block assembly comprising the block body and the covering material and the adhesive material disposed therebetween, and finishing means for finishing the pressed composite block assembly into the composite block by passing it through a hole of a size substantially corresponding to the contour of the composite block; the hole being formed through a scraper made of a flexible material.

BRIEF DESCRIPTION OF THE DRAWINGS

The present invention will now be explained specifically but not exclusively with reference to the accompanying drawings which illustrate embodiments wherein tiles are set on the surfaces of paving blocks, in which.

DETAILED DESCRIPTION OF THE INVENTION

Figure 1:
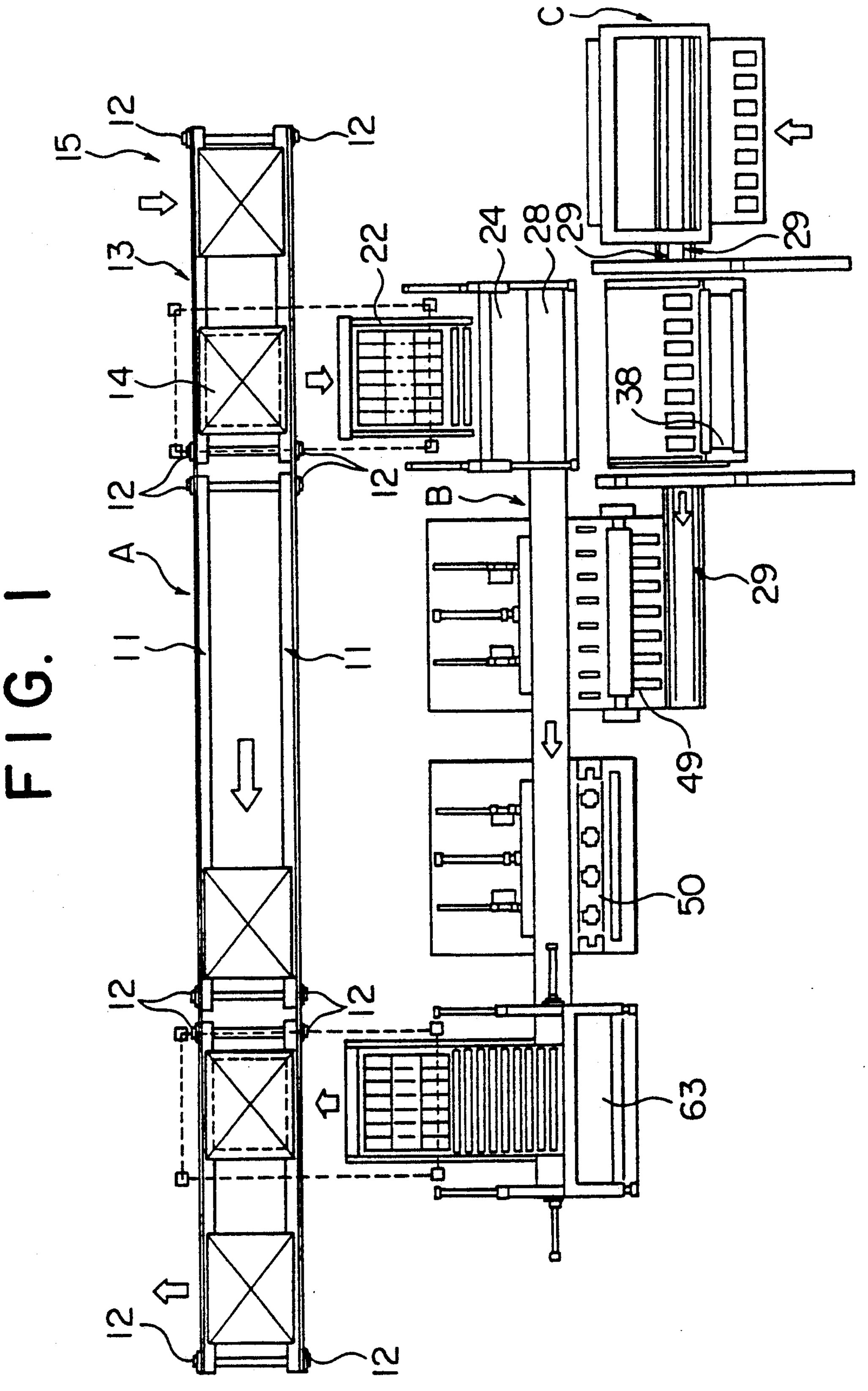
FIG. 1 is a schematic plan view showing a general structure of one embodiment of the present invention.
Figure 2:
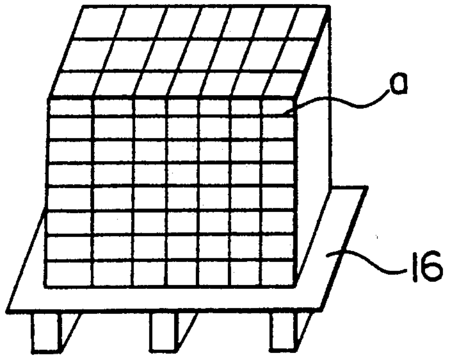
FIG. 2 is a perspective view showing a pallet and a stack of block bodies placed thereon.
Figure 3:
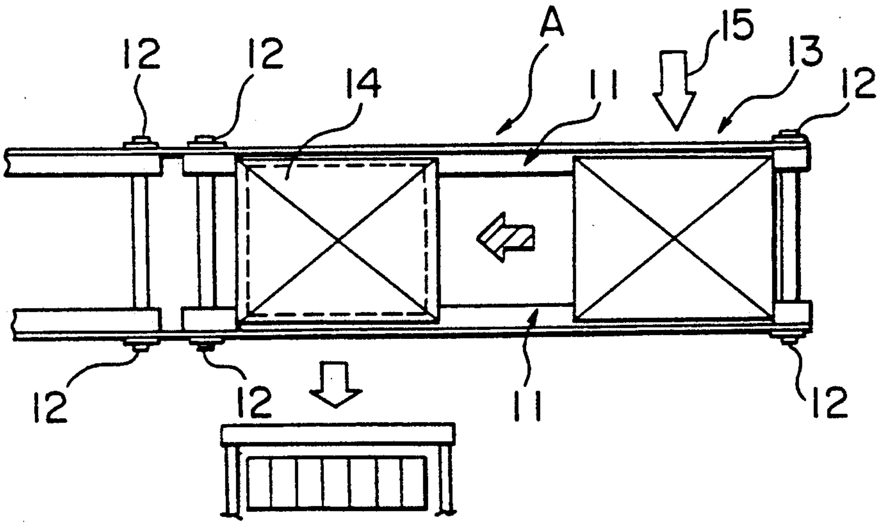
FIG. 3 is a plan view showing the delivery of the pallet from the predetermined position on a pallet delivery path to an elevator position.
Figure 4:
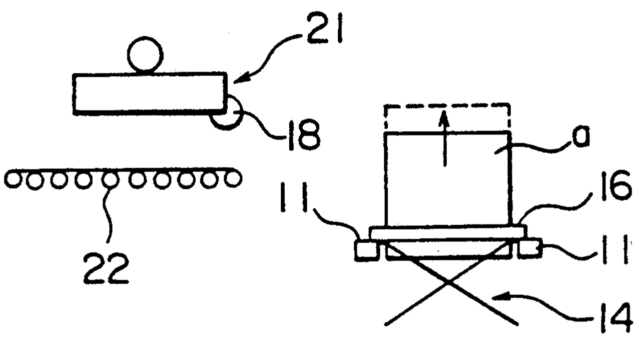
FIGS. 4 to 8 are front views showing a sequence of the operations wherein the uppermost block bodies located at a predetermined height by an elevator are clamped by a catcher and then put down on a block feeding conveyor.
Figure 5:
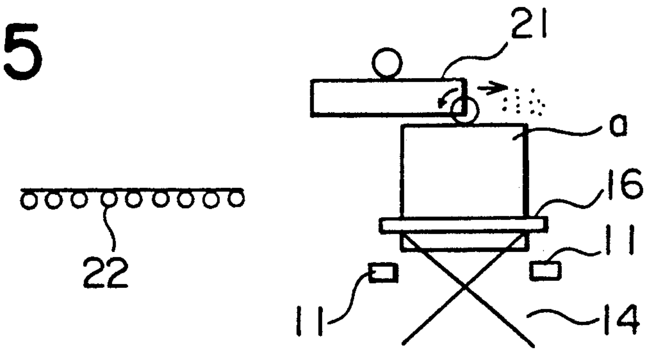
Figure 6:
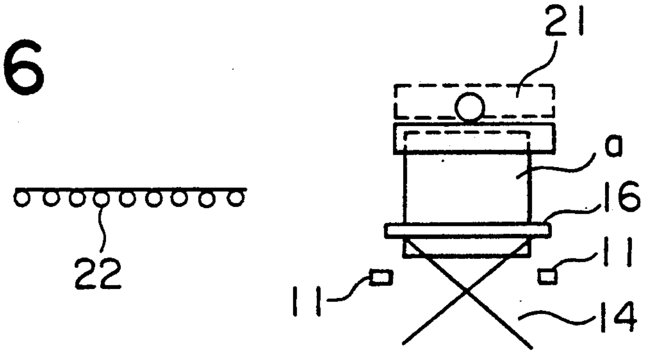
Figure 7:
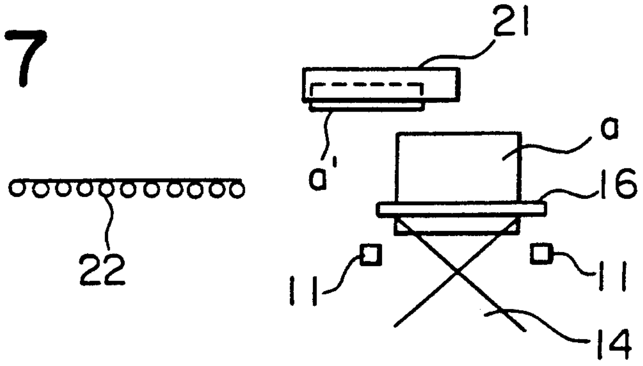
Figure 8:
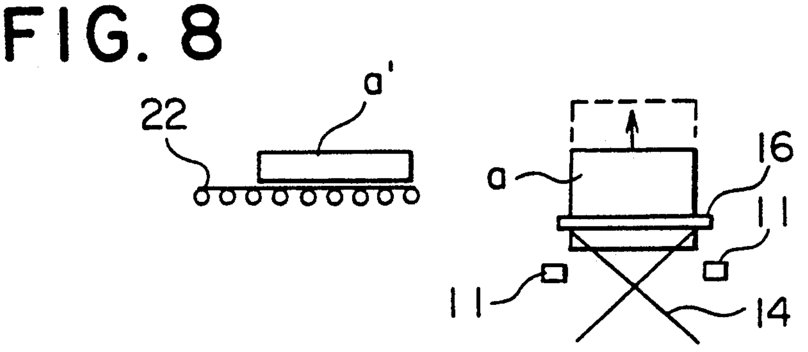
Figure 9:
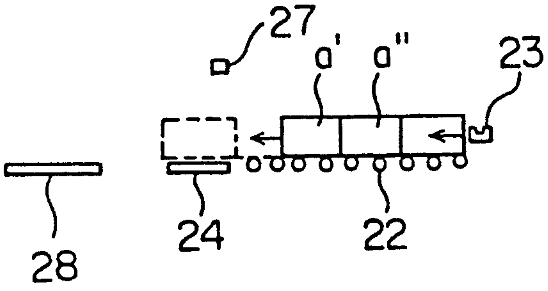
FIG. 9 is a front view illustrating the operation for pushing out the last row of block bodies placed on the block feeding conveyor with a pushing attachment, thereby advancing the whole stack by a distance of one row onto a movable table group.
Figure 10:
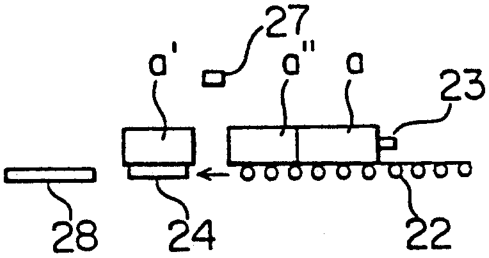
FIG. 10 is a front view illustrating the operation for advancing the movable table group to space the block bodies on the movable table group away from the next row of block bodies at a slight interval.
Figure 11:
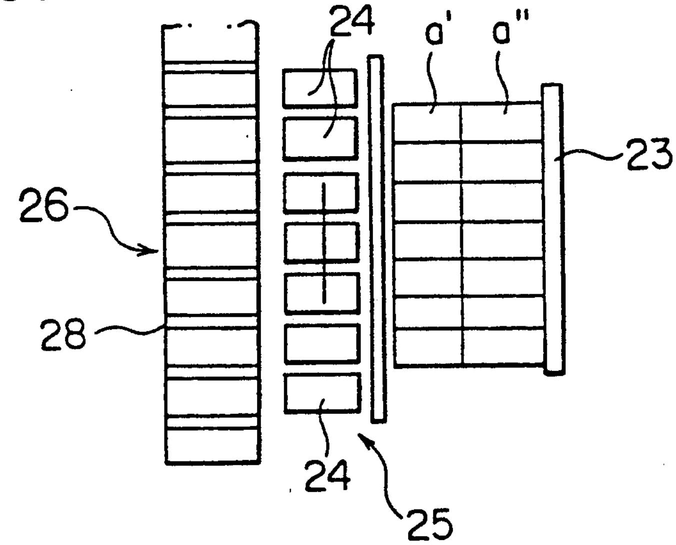
FIG. 11 is a plan view illustrating the operation for spacing movable tables forming the movable table group away from each other to space the block bodies away from each other.
Figure 12:
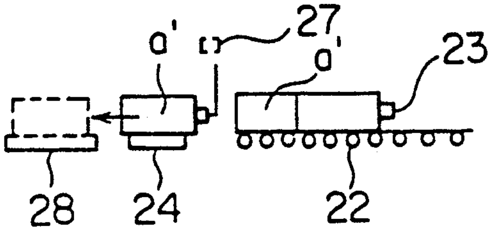
FIG. 12 is a plan view illustrating the operation of pushing out the block bodies on the movable table group onto a moving table.
Figure 13:
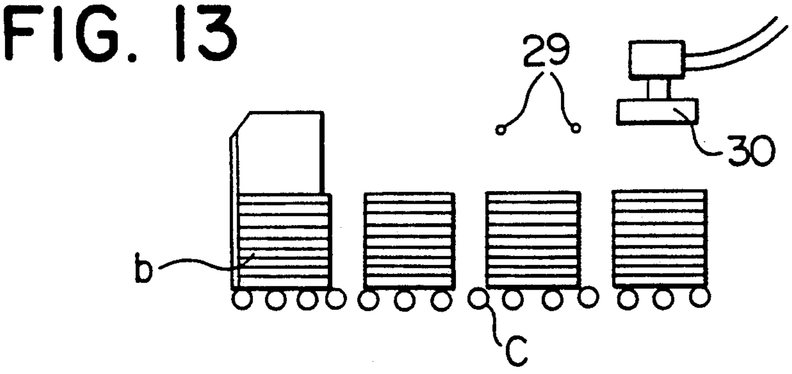
FIGS. 13 to 16 are front views illustrating a sequence of the operations for placing a covering material on a predetermined position of a covering material delivery path formed by two wire ropes by sucking and delivery means.
Figure 14:
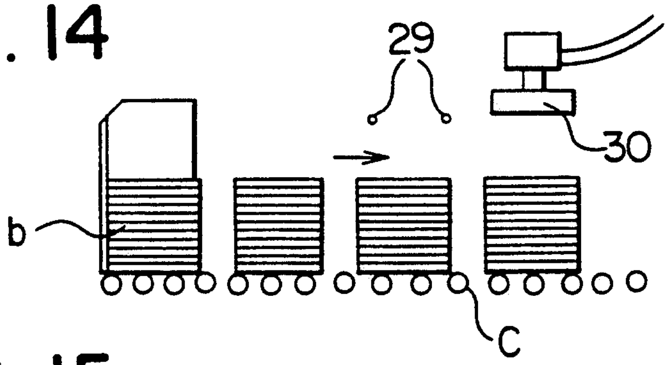
Figure 15:
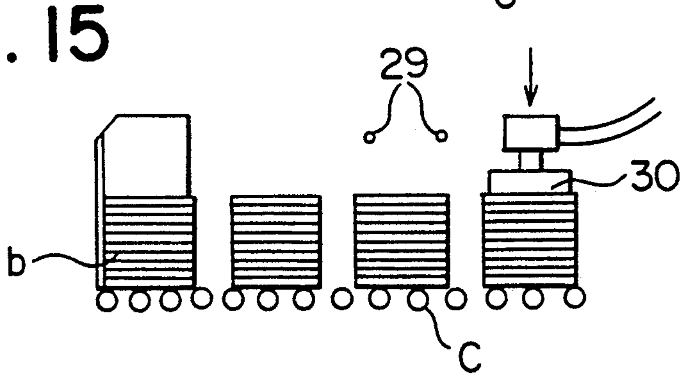
Figure 16:
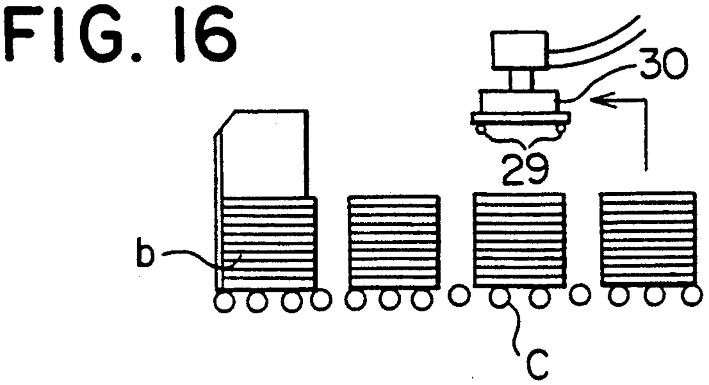

As illustrated in FIGS. 1 to 3, a pallet delivery path A is formed by a conveyor 13 comprising a pair of chains 11 running in parallel with each other at a given interval and sprockets 12 in engagement therewith. Below a given position of said delivery path A, there is provided an elevator 14 for elevating a pallet positioned on said delivery path A above it to the required height.

As illustrated in FIG. 2, a stack of sets of block bodies a arranged in rows are provided on a pallet 16 carried from a lead-in position 15 of said pallet delivery path A to above said elevator 14. An optical sensor (not shown) is provided at a position where the upper surfaces of the block bodies c of the uppermost stage can be looked out over, and there is provided control means for positioning the upper surfaces of the block bodies a of the uppermost stage to the predetermined height by said elevator 14.

Figure 44:
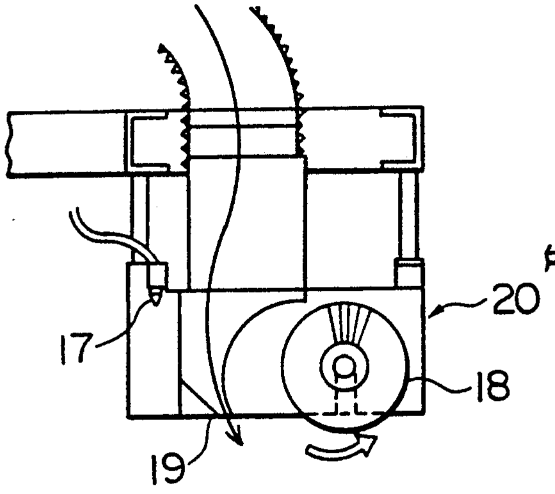
FIG. 44 is a front view showing one example of a cleaner.

As illustrated in FIGS. 4 to 8, a catcher generally shown at 21 is provided to clamp and catch the block body a' of the uppermost stage, said catcher 1 integrally including a water sprinkling nozzle 17 —see FIG. 44— for sprinkling water over the uppermost surface of said block body and a brush 18/air blower 19 combination for cleaning up concrete tailings and blowing off the rest of water sprinkled beforehand. The catcher 21 places the block body a' onto a block feeding conveyor 22 As illustrated in FIGS. 9 to 12, a pushing attachment 23 is provided to move the whole stack forward by a distance of one row by giving a push to the last row of block bodies a' put down on the conveyor 22.

Provided are a group 25 of movable tables 24 on which the one row of the block bodies a' pushed forward are individually placed and the number of which corresponds to the number of the block bodies a' of said one row. Said group 25 is moved forward to separate said block bodies a' from the next row of block bodies a" at a slight interval (see FIG. 10). Block arranging means 26 is provided to separate said movable tables 24 from each other to space the block bodies a' away from each other (see FIG. 11). The thus arranged block bodies a' are then pushed out forward by a block pusher 27 descending from its normal position located above them (see FIG. 12). The block bodies a' pushed out by said block pusher 27 are placed on a moving table 28 which is intermittently controlled in such a manner that it is guided to a block delivery path B and stopped at the predetermined position (see also FIG. 1).

Figure 17:
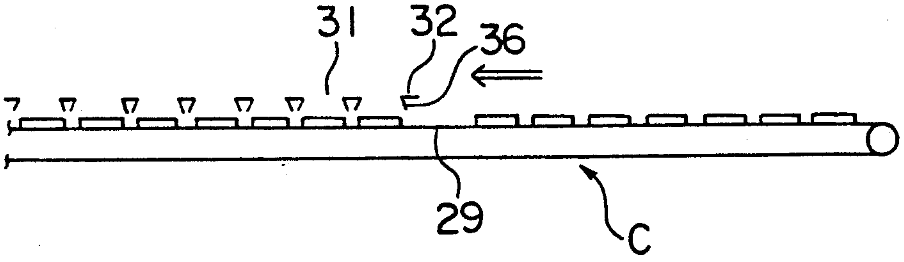
FIG. 17 is a front view illustrating the operation for moving the covering material to below a mask of an adhesive material applying portion by the covering material delivery path.

As illustrated in FIGS. 13 to 16, a covering material delivery path C is provided, which is constructed from two wire ropes 29 running in parallel with said block delivery path B (again, see also FIG. 1). There is provided means 30 for sucking covering materials b, such as tiles which are stacked with their front faces down and their back surfaces up and feeding them onto the upper face of a given position of said covering material delivery path C. As shown in FIG. 17, a mask sheet 32 is provided, which is uniform in its cross-sectional thickness and provided with rectangular mask holes 31 in line and at given intervals. Said mask sheet 32 has a thickness of about 4 mm, while each of said mask holes 31 includes a slope 40 extending from its surface toward its opening to a depth of about 3 mm (see also FIG. 21).

Figure 18:
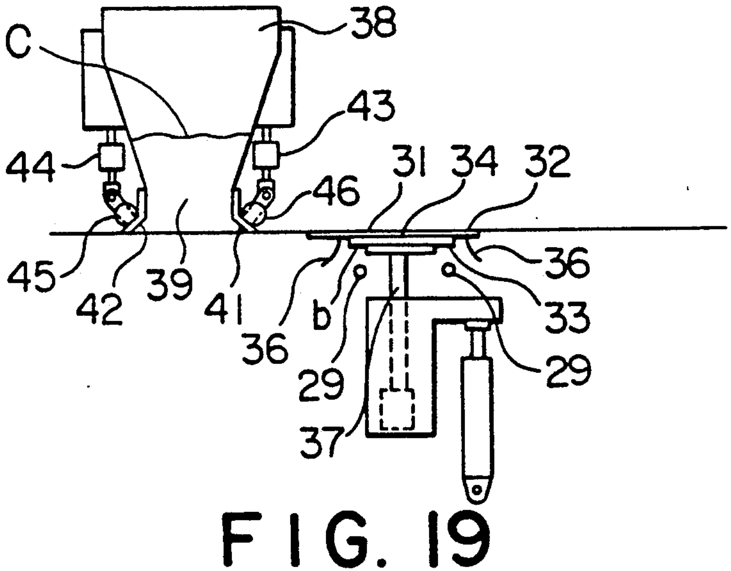
FIG. 18 is a front view illustrating the covering material pressed against the lower face of a mask sheet.

As illustrated in FIG. 18, the covering materials b with their front face 33 down and their back surfaces 34 up are then moved to below the mask sheet 32, and located relative to the mask holes 31. The tile used as said covering material b is about 92 mm by about 192 mm in size and about 10 mm in thickness. The block body a is about 96 mm by about 196 mm in size and about 70 mm in thickness.

Figure 19:
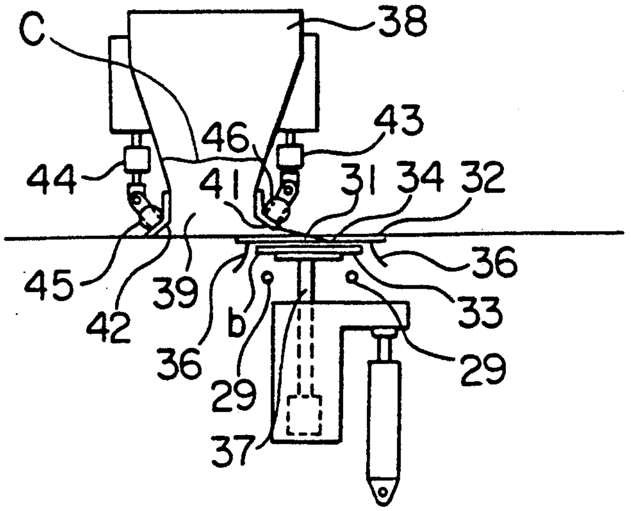
FIG. 19 is a front view illustrating an adhesive material hopper which is moving forward.

When each covering material b is located in correspondence to each mask hole 31, an elevator 37 pushes up the covering material b along a covering material positioning guide 36 provided around the bottom of each mask hole 31. Above the mask sheet 32, there is provided an adhesive material hopper 38 for storing a large amount of an adhesive material c such as mortar, which is kneaded to the required viscosity. As illustrated in FIG. 19, the adhesive material hopper 38 is designed in such a manner that its lower outlet 39 is movable along the upper face of each mask hole 31. Whenever the hopper 38 moves, the adhesive material c is smeared with a thickness corresponding to the thickness of the mask sheet 32 onto the predetermined central position of the back surface of the covering material b positioned on the bottom of each mask of the mask sheet 32.

Figure 21:
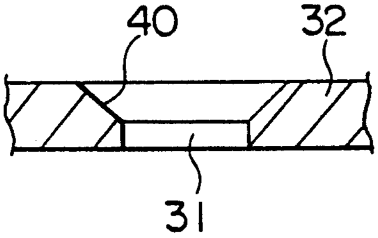
FIG. 21 is a sectional view of a mask hole in the mask sheet.

As already mentioned and shown in FIG. 21, each mask hole 31 is provided with the slope 40 extending from its surface toward its opening. Thus, the viscous adhesive material c entering the mask hole 31 is drawn toward the direction along which the lower outlet 39 in the hopper 38 moves, so that it releases from the slope of the mask 31. Alternatively, if the lower end of the mask 31 has a thickness of as thin as about 1 mm, the covering material b releases and flows down easily from the mask sheet 32. This reduces any likelihood that the adhesive material c would be deposited around the mask hole 31 in a reduced size or distorted shape. Accordingly, it is assured that the adhesive material is applied as desired over the back surface of the covering material b.

First and second scrapers 41 and 42, which selectively engage or disengage the mask sheet 32, are hingedly coupled at their upper portions to the lower end of the adhesive material hopper 38. Provided in association with the scrapers 41 and 42 are scraper operating cylinder means 43 and 44. The cylinder means 43 and 44 are designed to lift up the first scraper 41 and lift down the second scraper 41, when said hopper 38 moves forward, and lift up the second scraper 42 and lift down the first scraper, when the hopper moves backward In this way, any excessive adhesive material smeared onto the upper face of the mask sheet 32 is recycled into the outlet 39 of the hopper 38 and can thus be reused to avoid waste.

Figure 20:
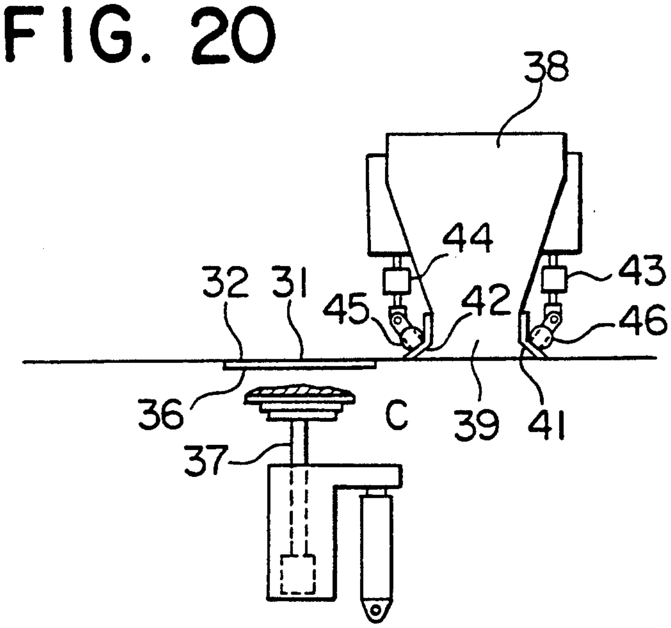
FIG. 20 is a front view illustrating the covering material having the adhesive material applied on its back surface by the forward movement of the adhesive material hopper, which is being put down on the covering material delivery path from the lower face of the mask sheet.
Figure 22:
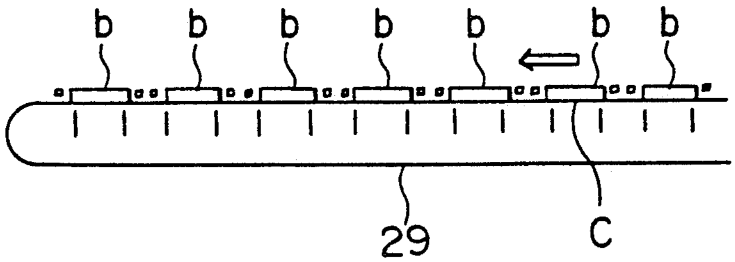
FIG. 22 is a front view illustrating the operation for moving the covering material to a covering material inverter by the covering material delivery path.
Figure 23:
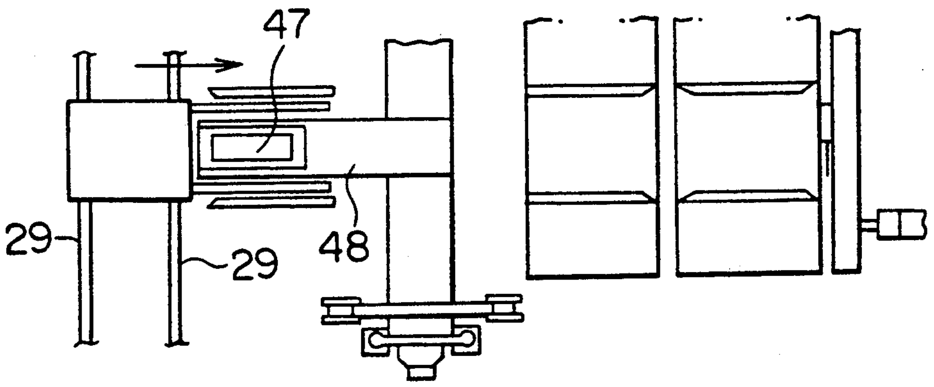
FIG. 23 is a plan view showing part of the covering material inverter.
Figure 24:
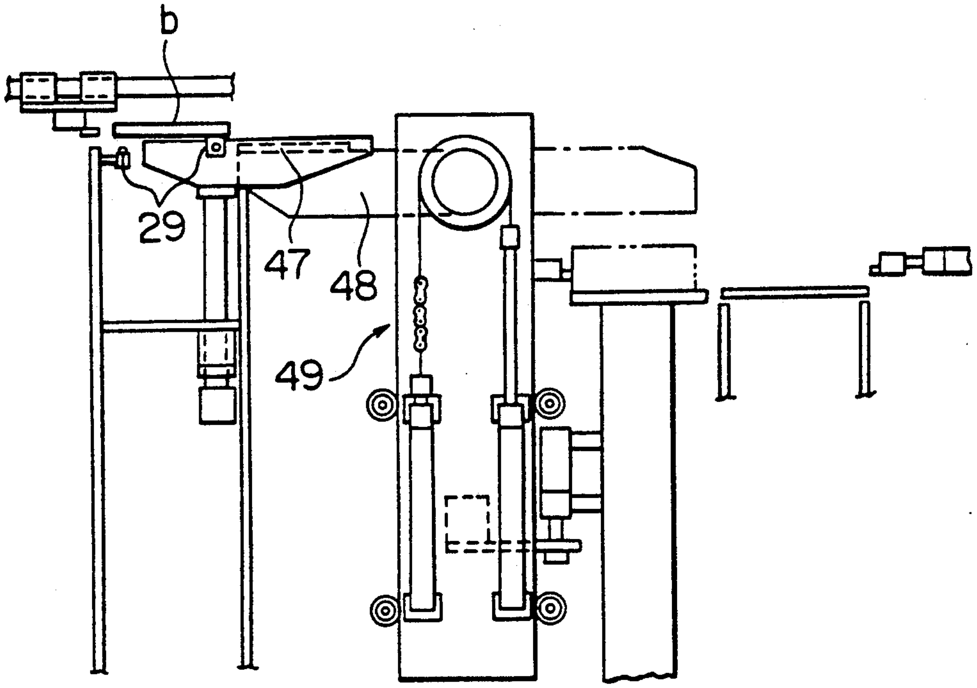
FIG. 24 is a front view of the covering material inverter shown in plan view in FIG. 23.
Figure 25:
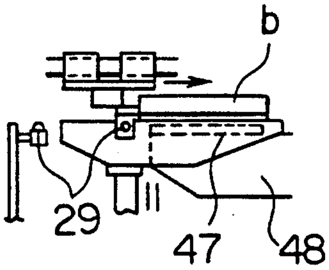
FIG. 25 is a front view illustrating the covering material with the adhesive material applied on its back surface, which is moved to a sucking port of a swing arm of the covering material inverter.
Figure 26:
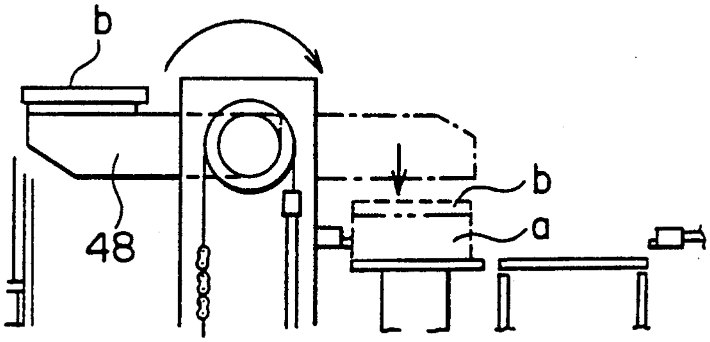
FIG. 26 is a front view illustrating the inverting operation of the covering material inverter and the operation for inverting the covering material placed on the sucking port of the swing arm and placing it on the block body.
Figure 27:
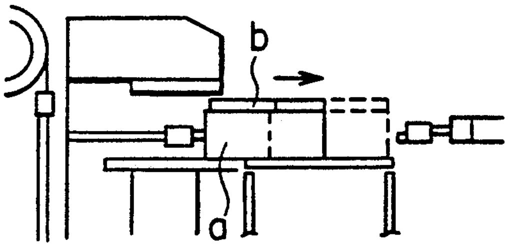
FIG. 27 is a front view illustrating the operation for pushing out the block body, on which the covering material is placed through the adhesive material, to the next carrying means.

The adhesive material c deposited by the forward or backward movement of the adhesive material hopper 38 onto the back surface 34 of the covering material b with a thickness corresponding to the thickness of the mask sheet 32. If a vibrator 45 or 46 is additionally provided to said scrapers 41 and 42 in this case, then the adhesive material c is uniformly smeared on the back side 34 of the covering material by the vibration thereof. After the smearing of the adhesive material onto the back surface 34 of the covering material is completed, the elevator 37 descends, as shown in FIG. 20, to place the covering material b on the covering material delivery path C, as shown in FIG. 22. Then, the covering material b is transferred to the next predetermined step.

Figure 28:
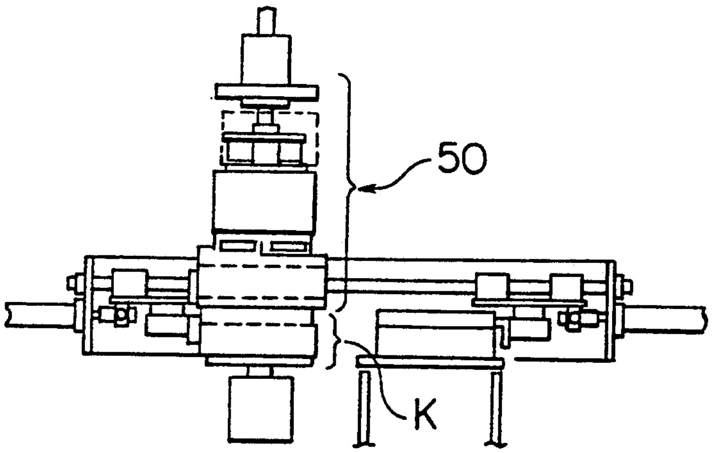
FIG. 28 is a front view illustrating the operation of positioning on pressing means a composite block assembly, in which the covering material is placed on the block body through the adhesive material.
Figure 29:
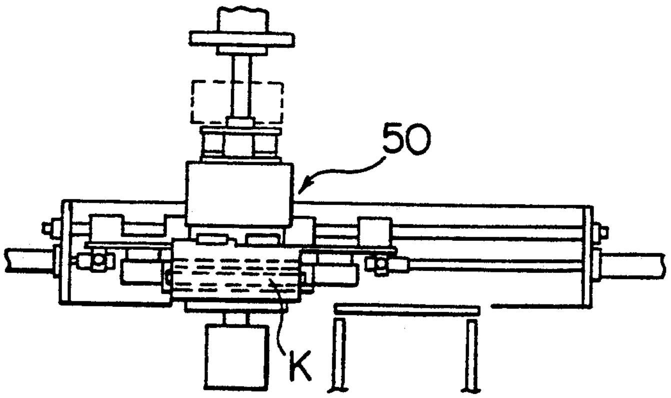
FIG. 29 is a front view illustrating the operation for pressing the composite block assembly by the pressing means.
Figure 30:
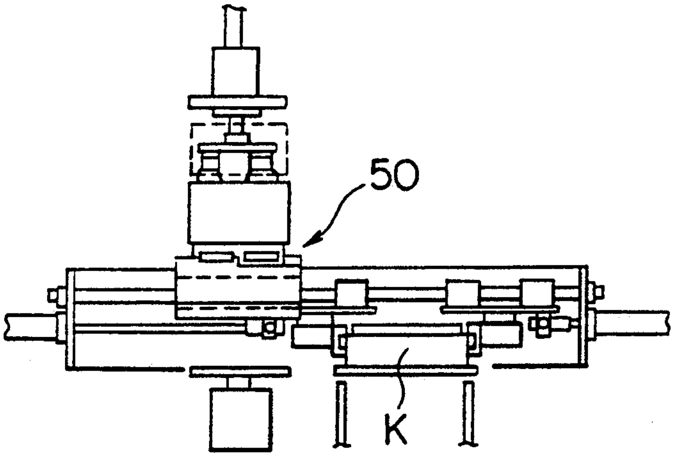
FIG. 30 is a front view illustrating the operation for pushing out the composite block assembly pressed by the pressing means to the next carrying means.

On said path C, a swing arm 48 is provided, having a suction port 47 for sucking the covering material b to which the adhesive material c has been previously applied on its back surface 34 (see FIGS. 23 to 27). The swing arm 48 is swung through a half turn between the path C and the block delivery path B. More specifically, a covering material inverting means 49 drives the swing arm 48 in an arc toward the block delivery path B (see FIG. 26) thereby inverting the covering material B and placing it on the block body a positioned along the block delivery path. Provided at the next position is a pressing means 50 for loading vibration and/or pressure on a composite block assembly K which comprises the covering material b, the interposed adhesive material and the block body a (see FIGS. 28–30).

Figure 41:
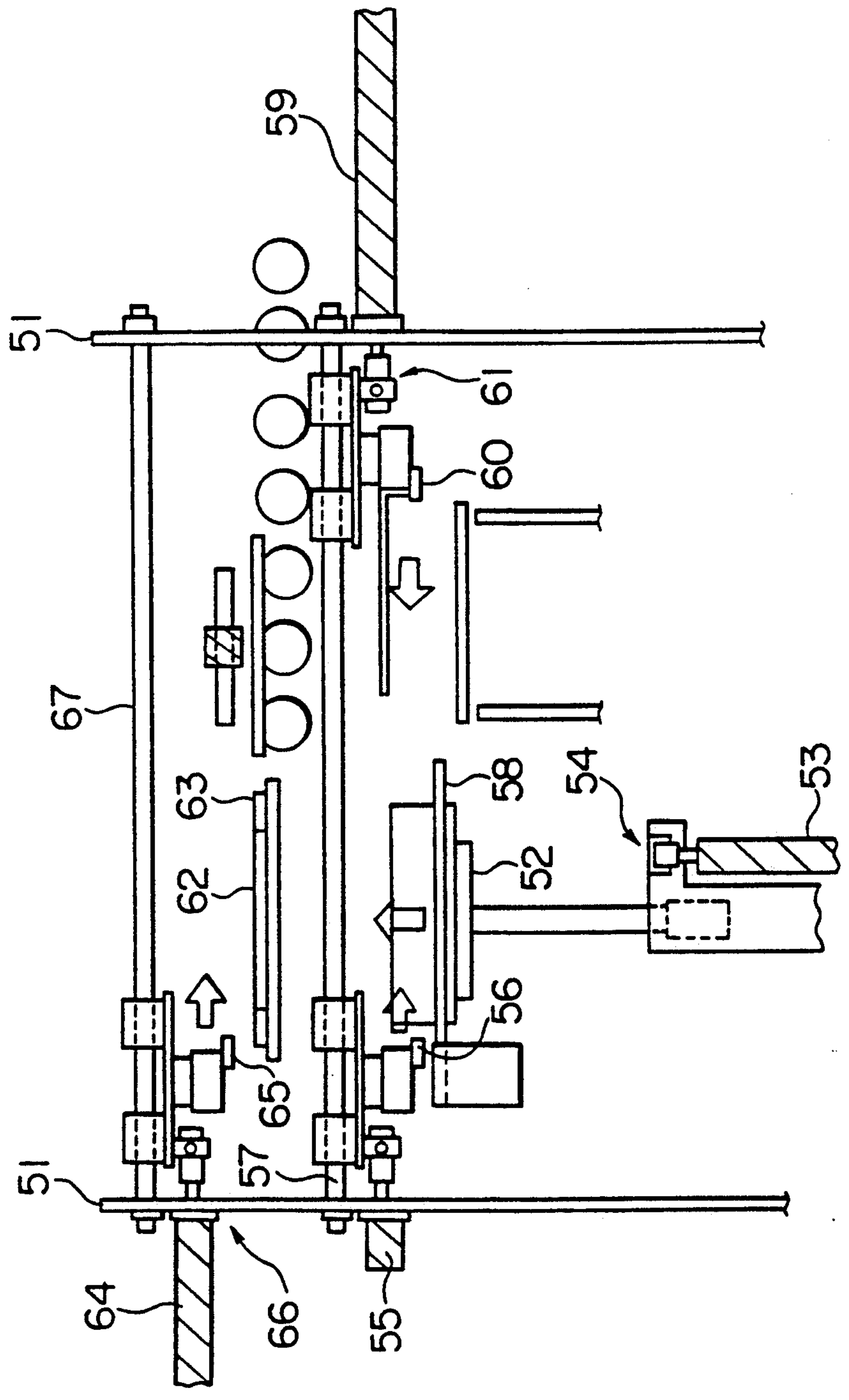
FIG. 41 is an enlarged view illustrating the structure of the finishing step of FIG. 31.
Figure 43:
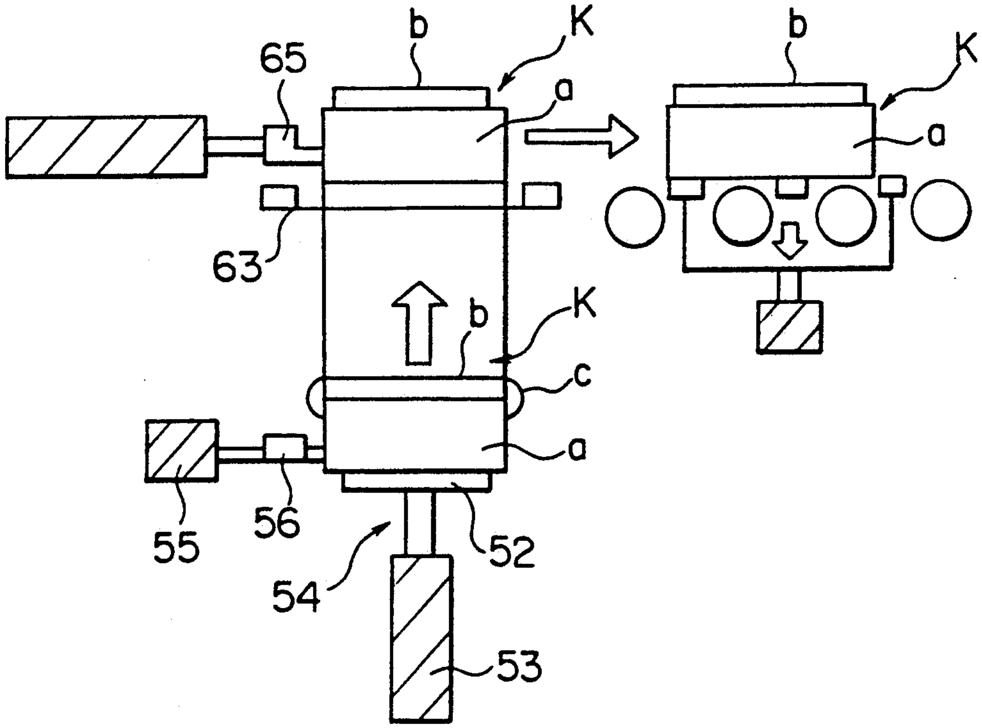
FIG. 43 is a view illustrating a sequence of the finishing treatments.

As illustrated in FIG. 43, any overflowing adhesive material K that results from the pressing is deposited around the composite block K, which is then placed on a block receiving table 52 provided at a given position within a machine frame 51. As illustrated in FIG. 41, the block receiving table 52 is connected at its lower face with one end of a cylinder 53 for vertically displacing it to the required position at which it is supported, thereby forming vertically displacing means 54.

Figure 42:
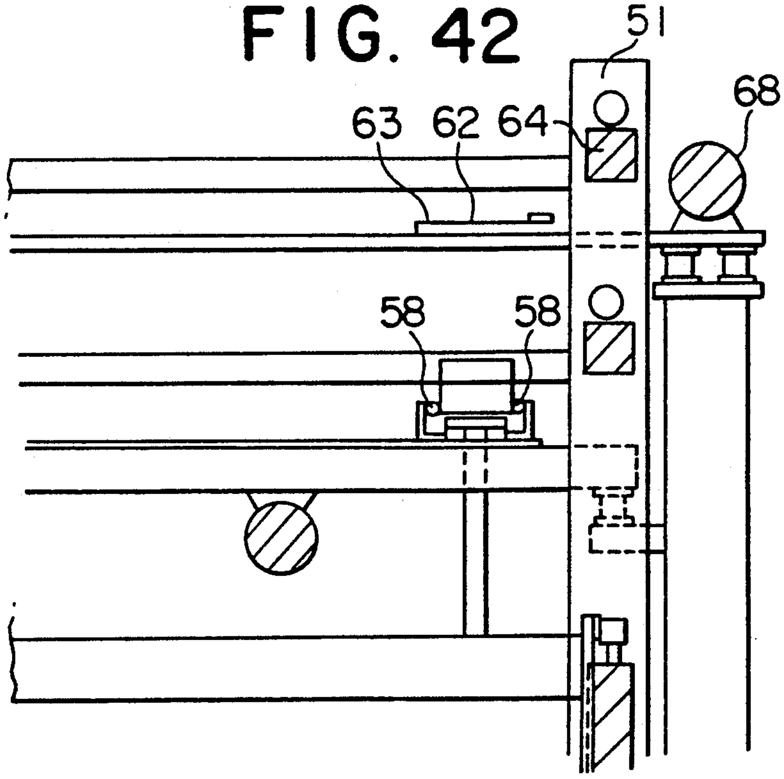
FIG. 42 is a side view of that structure.

At the lowermost position of said block receiving table 52, a stopper 56 with a forward/backward displacing cylinder 55 for defining the position at which the forward movement of the composite block K is stopped is movably provided on a guide shaft 57 laid within the machine frame 51. As illustrated in FIG. 42, there is provided a guide 58 for guiding the composite block c to the predetermined position in its widthwise direction. A pusher 60 with a reciprocating cylinder 59 for pushing the composite block K into the position set by the stopper 56 along the guide 58 is movably provided on the guide shaft 57, thereby forming pusher means 61. Above the position defined by said stopper 56, guide 58 and pusher means 61, a third scraper 63 is fixedly laid. The scraper 63 is provided therethrough with a hole 62 of a size substantially identical with the contour of the composite block K. The scraper 63 is also made of a flexible material.

After the composite block K is guided to and located at the position defined by the stopper 56, guide 58 and pusher means 61, the stopper 56 and pusher means 61 are retracted to release a restraining force on the composite block. Thereafter, the vertically displacing means 54 is driven upward to push the composite block K through the hole 62 in said scraper 63. In the process of forcibly passing the composite block K through the hole 62 in the scraper 63, the excess adhesive material c overflowing the composite block K is removed by said scraper 63. In this manner, the composite block K is finished into a composite block product.

The composite block product is then fed to the predetermined recovery route by the forward movement of feeder means 66 comprised of a mover 65 and a forward/backward displacing cylinder 64. The mover 65 is movably mounted on a guide shaft 67 laid horizontally at the predetermined position above the guide shaft 57.

The scraper 63 is mechanically connected with a vibrator 68 which works during the operation of the system. By the operation of the vibrator 68, vibrations are applied to the scraper 63 to vibrate it. A part of the adhesive material scraped off during the above finishing process is unavoidably deposited around the hole 62 in the scraper 63. However, it is completely scraped off by the vibration of the scraper 63, as mentioned above.

After a series of finishing steps have been completed, the movable parts return to their original positions for finishing the next composite block.

Figure 31:
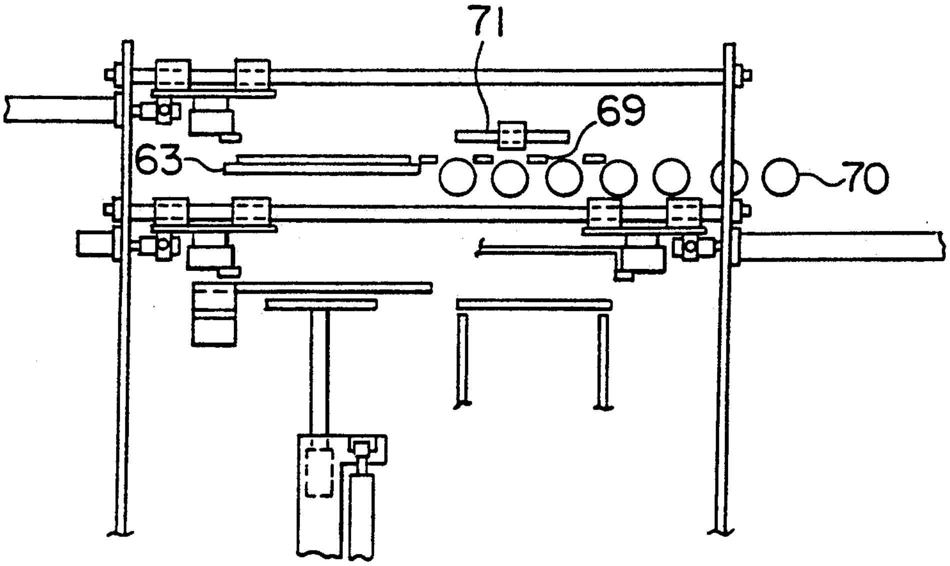
FIG. 31 is a front view showing the structure of a finishing step.
Figure 32:
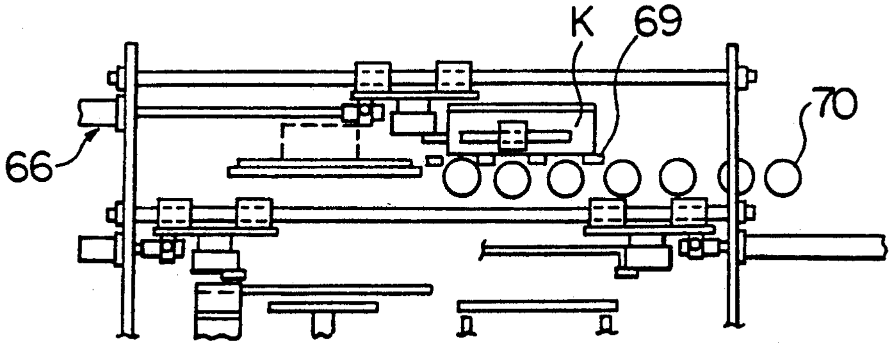
FIG. 32 is a front view showing the finished composite block which is pushed out onto vertically displaceable rails.
Figure 33:
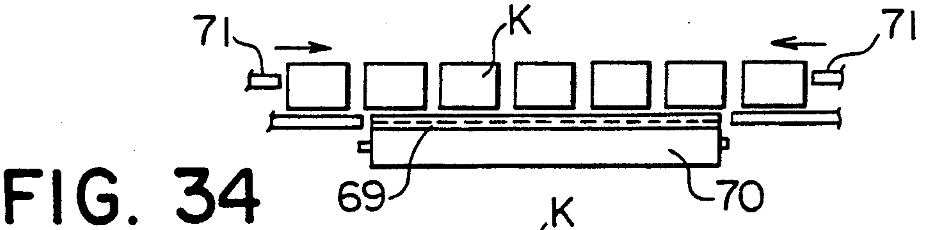
FIGS. 33 and 34 are views illustrating a sequence of the operations for reducing gaps between the composite blocks to zero by gap reducing means.
Figure 34:
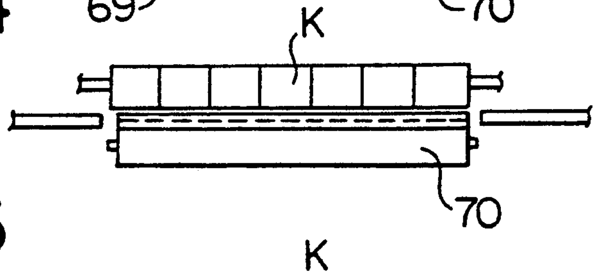
Figure 35:
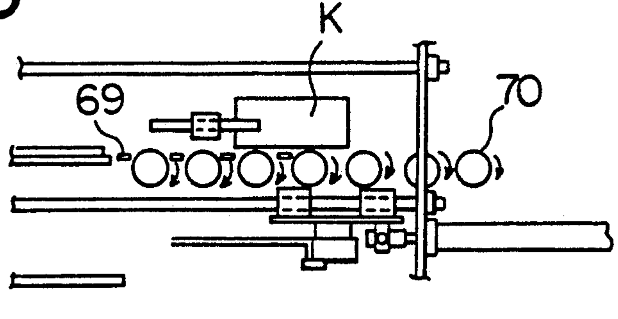
FIG. 35 is a front view of the operation for feeding the composite blocks forward by the rotation of a roller conveyor after the rails of the gap reducing means descend.
Figure 36:
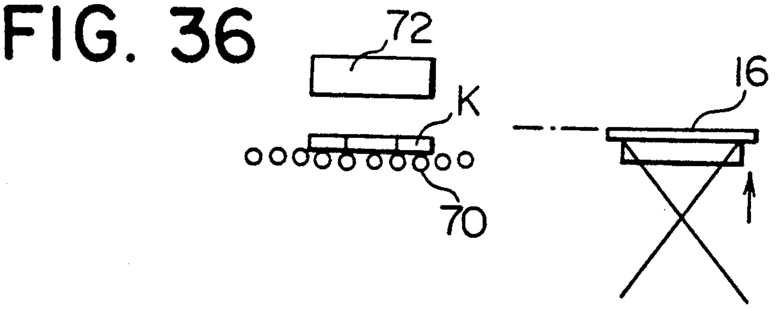
FIGS. 36 to 40 are views showing a sequence out composite blocks upon an empty pallet supplied to the terminal of the pallet delivery path by the catcher.
Figure 37:
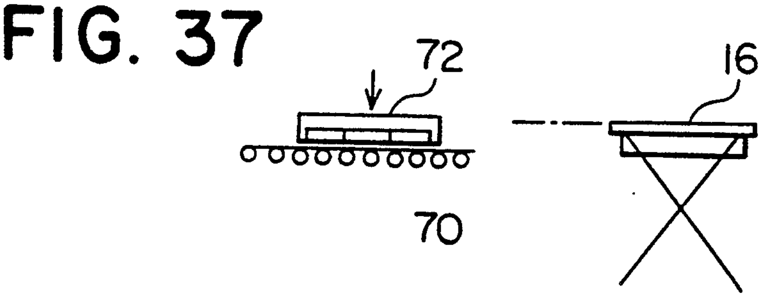
Figure 38:
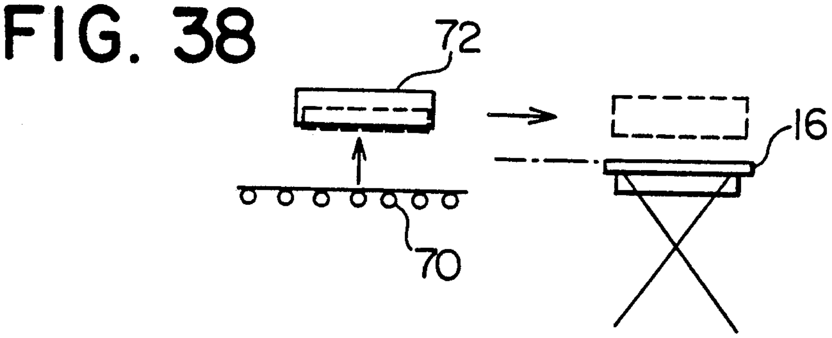
Figure 39:
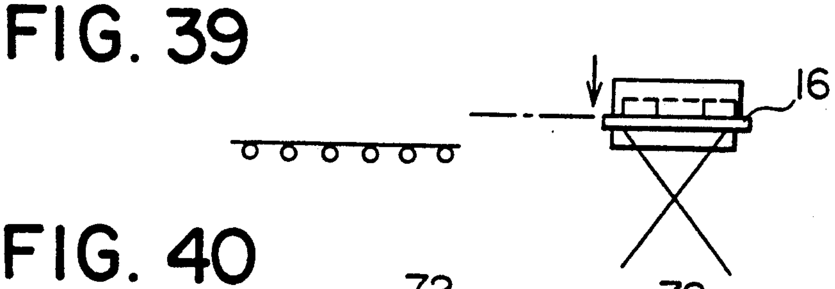
Figure 40:
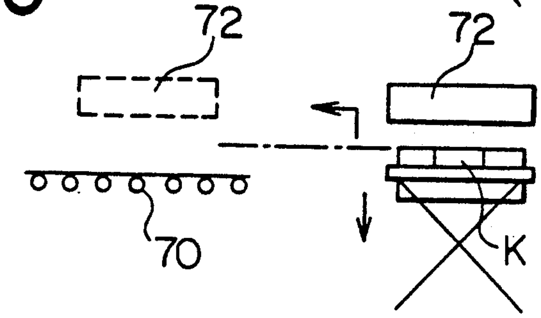

As illustrated in FIG. 31, there are provided a vertically displaceable rail 69 on which the composite block K, pushed out by the pusher means 66, is placed and a roller conveyor 70 at such an interval with respect thereto that it is vertically displaceable. As illustrated in FIGS. 33 and 34, there is means 71 for giving a push to both end sides of the composite blocks pushed out onto the rail 69 by said pusher means 66 to reduce gaps therebetween to zero. After the rail 69 descends, as illustrated in FIG. 35, the composite block placed on said roller conveyor 70 is fed forward by the rotation of said roller conveyor 70.

As illustrated in FIGS. 36 to 40, the composite blocks K fed out are successively stacked by a catcher 72 as desired, on an empty pallet 16 fed to the terminal of said pallet delivery path A and then discharged.

Figure 45:
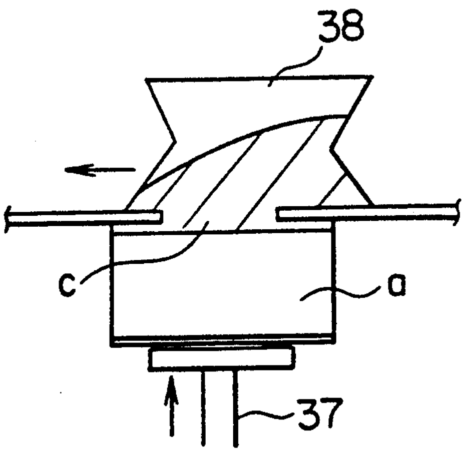
FIG. 45 is a partly sectioned, front view showing part of the structure for applying adhesive material on the surface of the block body.
Figure 46:
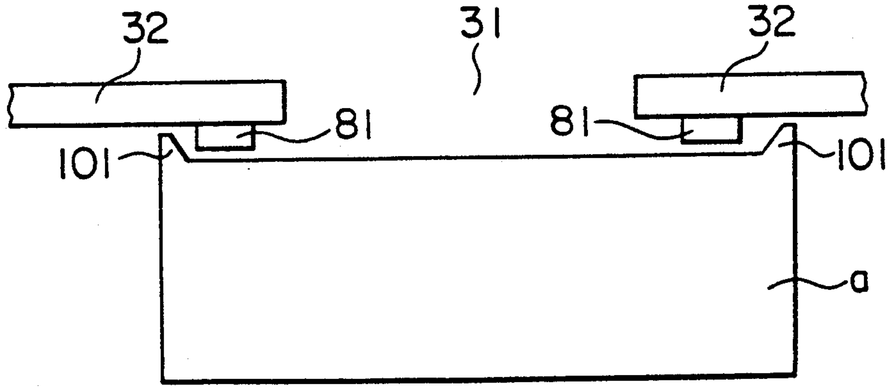
FIG. 46 is a front view showing another example of that structure.
Figure 47:
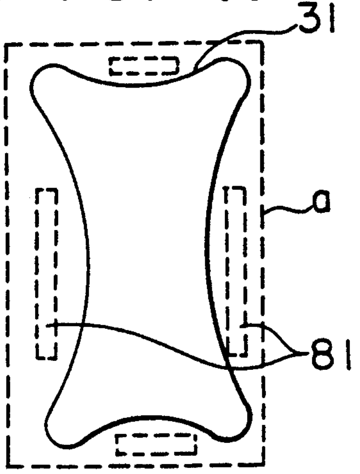
FIG. 47 is a plan view showing the relation between one example of the mask hole and the position on which a stopper is mounted.

In the foregoing embodiment, the adhesive material is applied on the back surface of the covering material. In what follows, reference will be made to the application of the adhesive material on the surface of the block body. As illustrated in FIG. 45, the block body is positioned below the hole in the applicator for an adhesive material such as mortar, and the adhesive material is applied by the movement of an adhesive material hopper. Subsequent pressing and finish work may be carried out with similar pressing and finishing means as mentioned above. When the block body includes on its upper surface such ribs as shown in FIG. 46, a stopper 81 is provided on the lower surface of the mask sheet, as illustrated, to adjust the thickness of mortar. In order that mortar is well spread over the back surface of the covering material, a mask of such a shape as shown in FIG. 47 is used. In this case, the stopper may be attached at such a position as illustrated. This stopper means has the advantage of dispensing with the inversion of the covering material and so simplifying the system.

As will be understood from the foregoing, the present invention provides a system for making composite block products, which is perfectly automated, and so makes a great contribution to increased productivity as well as improvement and uniformization of product quality.

We claim:

1. A system for making a composite block having a desired contour including a block body formed of mortar or concrete and a covering material applied to an upper surface of said block body, comprising in combination:

applicator means for supplying an adhesive material to said block body or covering material, pressing means for loading vibration pressure on a block assembly including said block body, said covering material and said adhesive material disposed therebetween, and finishing means for finishing said pressed block assembly into said composite block having said desired contour by passing said block assembly through a hole in a scraper of flexible material wherein said hole is of a size substantially identical with said contour of said composite block.

2. A system as claimed in claim 1, wherein said adhesive material applicator means for applying said adhesive material on a back surface of said covering material of said block assembly includes a mask sheet provided with at least one mask hole of a particular shape, a carriage for relatively moving and positioning said covering material with a front face down and said back surface up to and below said mask sheet, an elevator for bringing said covering material in contact with said at least one mask hole when said covering material is positioned relative to said at least one mask hole and an adhesive material hopper for applying said adhesive material in recesses formed by the close contact of said at least one mask hole with said covering material, said adhesive material hopper being designed to move along said upper surface of said at least one mask hole in said mask sheet.

3. A system as claimed in claim 1, wherein said adhesive material applicator means for applying said adhesive material on a surface of said block body of said block assembly includes a mask sheet provided with at least one mask hole of a particular shape, a carriage for relatively moving and positioning said block body with a front face up to and below said mask sheet, an elevator for bringing said covering material in contact with said at least one mask hole when said block body is positioned relative to said at least one mask hole and an adhesive material hopper for applying said adhesive material in recesses formed by the close contact of said at least one mask hole with said block body, said adhesive material hopper being designed to move along said upper surface of said at least one mask hole in said mask sheet.

4. A system as claimed in claim 2, wherein said adhesive material hopper is provided with a lower outlet and first and second scrapers with operating cylinders, which engage or disengage said mask sheet, each of said scrapers being additionally provided with a vibrator.

5. A system as claimed in claim 4, wherein said scrapers provided on said adhesive material hopper operate so that when said hopper moves forward, said first scraper is lifted up while said second scraper is moved down the said vibrator provided thereon in operation; and when said hopper moves backward, said second scraper is lifted up while said first scraper is moved down with said vibrator provided thereon in operation.

6. A system as claimed in claim 2 wherein a periphery of said upper surface of said mask sheet about said opening includes a downward slope.

7. A system as claimed in claim 1, further including a positioning stopper with a forward/backward moving cylinder for moving said composite block bonded together thereby forward to a predetermined stop position, a guide for guiding said composite block to said predetermined stop position in its widthwise direction, means for forcing said composite block into said positioning stopper along said guide, a scraper provided above said position defined by said stopper, guide and forcing means, said scraper being provided therethrough with a hole of a size substantially corresponding to said the contour of said composite block and formed of a flexible material, vertically displaceable means with a block receiving table for and reciprocating means for pushing out said composite block passed through said hole in the predetermined widthwise direction.

8. A system as claimed in claim 7, wherein said scraper is additionally provided with a vibrating machine.

9. A system as claimed in claim 3, wherein said adhesive material hopper is provided with a lower outlet and first and second scrapers with operating cylinders, which engage or disengage said mask sheet, each of said scrapers being additionally provided with a vibrator.

10. A system as claimed in claim 9, wherein said scrapers provided on said adhesive material hopper operate so that when said hopper moves forward, said first scraper is lifted up while said second scraper is moved down with said vibrator provided thereon in operation; and when said hopper moves backward, said second scraper is lifted up while said first scraper is moved down with said vibrator provided thereon in operation.

11. A system as claimed in claim 3 wherein a periphery of said upper surface of said mask sheet about said opening includes a downward slope.

12. A system as claimed in claim 4, wherein a periphery of said upper surface of said mask sheet about said opening includes a downward slope.

* * * * *